(12) United States Patent
Jensen et al.

(10) Patent No.: US 9,964,440 B2
(45) Date of Patent: *May 8, 2018

(54) WAFER LEVEL SPECTROMETER

(71) Applicant: KLA Tencor Corporation, Milpitas, CA (US)

(72) Inventors: Earl M. Jensen, Santa Clara, CA (US); Mei H. Sun, Los Altos, CA (US); Kevin O'Brien, Menlo Park, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/860,598

(22) Filed: Sep. 21, 2015

(65) Prior Publication Data

US 2016/0011046 A1    Jan. 14, 2016

Related U.S. Application Data

(63) Continuation of application No. 13/491,442, filed on Jun. 7, 2012, now Pat. No. 9,140,604.
(Continued)

(51) Int. Cl.
*H01L 27/142* (2014.01)
*G01J 3/02* (2006.01)
(Continued)

(52) U.S. Cl.
CPC ............. *G01J 3/0259* (2013.01); *G01J 1/58* (2013.01); *G01J 3/021* (2013.01); *G01J 3/0205* (2013.01);
(Continued)

(58) Field of Classification Search
CPC . H01L 27/1421; G01J 3/46; G01J 3/51; G01J 3/513
(Continued)

(56) References Cited

U.S. PATENT DOCUMENTS

| 4,432,644 A | 2/1984 | Demers et al. |
| 5,162,841 A | 11/1992 | Terashita |

(Continued)

FOREIGN PATENT DOCUMENTS

| CN | 1977543 A | 6/2007 |
| CN | 101267192 A | 9/2008 |

(Continued)

OTHER PUBLICATIONS

Taiwanese Office Action for TW Application No. 101121651, dated Dec. 8, 2015.
(Continued)

*Primary Examiner* — Renee Chavez
(74) *Attorney, Agent, or Firm* — JDI Patent; Joshua Isenberg (57) ABSTRACT

A sensor apparatus has a substrate and a spectrally selective detection system, and a cover. The spectrally sensitive detection system is sandwiched between the substrate and the cover. The spectrally selective detection system includes a generally laminar array of wavelength selectors optically coupled to a corresponding array of optical detectors located within the substrate. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

32 Claims, 8 Drawing Sheets

Related U.S. Application Data (60) Provisional application No. 61/498,500, filed on Jun. 17, 2011.

(51) Int. Cl.
*G01J 1/58* (2006.01)
*G01J 3/36* (2006.01)
*G01J 3/12* (2006.01)

(52) U.S. Cl.
CPC .......... *G01J 3/0256* (2013.01); *G01J 3/0262* (2013.01); *G01J 3/36* (2013.01); *G01J 2003/1213* (2013.01)

(58) Field of Classification Search
USPC .................................. 250/226; 356/402, 416
See application file for complete search history.

(56) References Cited

U.S. PATENT DOCUMENTS

| | | | |
|---|---|---|---|
| 6,031,653 | A | 2/2000 | Wang |
| 7,144,133 | B2 | 12/2006 | Bierhuizen |
| 7,338,202 | B1 | 3/2008 | Kapat et al. |
| 7,482,576 | B2 | 1/2009 | Mundt et al. |
| 9,140,604 | B2 | 9/2015 | Jensen et al. |
| 2004/0007326 | A1 | 1/2004 | Roche et al. |
| 2006/0289763 | A1 | 12/2006 | Mundt et al. |
| 2007/0171001 | A1 | 7/2007 | Naniwada et al. |
| 2009/0323060 | A1 | 12/2009 | Knipp |
| 2011/0112769 | A1 | 5/2011 | Niederberger et al. |
| 2012/0044489 | A1 | 2/2012 | Chakravarty et al. |
| 2012/0206726 | A1 | 8/2012 | Pervez et al. |

FOREIGN PATENT DOCUMENTS

| | | |
|---|---|---|
| EP | 0422611 A2 | 5/1992 |
| WO | 0219438 A | 3/2002 |
| WO | 2011046875 A1 | 4/2011 |

OTHER PUBLICATIONS

Final Office Action for U.S. Appl. No. 13/491,442, dated Nov. 28, 2014.
Non-Final Office Action for U.S. Appl. No. 13/491,442, dated Jul. 15, 2014.
Non-Final Office Action for U.S. Appl. No. 13/491,442, dated Feb. 20, 2015.
Chinese Office Action for CN Application No. 201280036758.X, dated May 6, 2015.
International Search Report and Written Opinion for International Application No. EP12800456, dated Nov. 4, 2014.
Don S. Goldman, P. L. White, and N. C. Anheier, "Miniaturized spectrometer employing planar waveguides and grating couplers for chemical analysis," 1990, Optical Society of America, vol. 29, No. 31, 4583-4589.
A. S. Jugessur et al . "Compact and integrated 2-D photonic crystal super-prism filter-device for wave length demultiplexing applications", Optical Society of America, Feb. 20, 2006, vol. 14, No. 4.
PCT International Application No. PCT/US2012/042065 as dated Jun. 12, 2012.
PCT International Search Report issued for PCT International Application No. PCT/US2012/042065, dated Feb. 26, 2013.
Chinese Office Action for CN Application No. 201611139570.4, dated Sep. 28, 2017.
Taiwanese Office Action for Taiwan Patent Application No. 106117786, dated Oct. 30, 2017.

WAFER LEVEL SPECTROMETER

CLAIM OF PRIORITY

This application is a continuation of U.S. application Ser. No. 13/491,442, filed Jun. 7, 2012. U.S. application Ser. No. 13/491,442 claims the priority benefit of U.S. Provisional Application No. 61/498,500, filed Jun. 17, 2011, the entire contents of which are incorporated herein by reference.

FIELD OF THE INVENTION

Embodiments of the present invention relate to a metrology wafer with embedded spectrometer(s) for the purpose of measuring spectral emissions within a processing environment.

BACKGROUND OF THE INVENTION

Manufacturing processes such as those used for the production of electronic devices, flat panel displays, and lithography masks and processes for fabricating semiconductor devices often require that a suitable workpiece be subjected to a sequence of discrete process operations that involve optical radiation. Many of these processes are very sensitive to the process conditions and are preferably carried out within individual process chambers, often referred to as process tools, within which very specific conditions are established. Modern manufacturing facilities for such process tools typically use robotic transfer mechanisms as part of the overall automation of the production process.

The ability to establish and maintain precise conditions within the process chambers accurately and reproducibly is needed for the successful production of numerous types of products. Examples of products of particular importance are some of the state-of-the-art electronic devices such as semiconductor devices, flat panel display devices, and lithography masks. In order to achieve the high device yields and performance necessary for commercial success, the conditions within a process chamber are, in some cases, continuously monitored and controlled using sensors designed to measure specific physical parameters. Typically, these control sensors are built into the process tool so as to measure the parameter of interest such as optical radiation at a specific location within the process tool.

For applications such as the plasma processing of workpieces using a glow discharge, the techniques typically available for monitoring the plasma process conditions can suffer from a variety of problems. A typical problem is that the standard methods are intrusive in that they require modifications to the process chamber or process operating conditions. Another problem with the standard methods is that the standard methods typically provide only global measurements or averaged measurements for a region of the process. In general, currently available monitoring techniques and apparatuses cannot easily provide non-intrusive, spatially and/or temporally resolved measurements of optical radiation parameters for processing a substrate.

It is within this context that embodiments of the present invention arise.

BRIEF DESCRIPTION OF THE DRAWINGS

Objects and advantages of the invention will become apparent upon reading the following detailed description and upon reference to the accompanying drawings in which.

2

DESCRIPTION OF THE SPECIFIC EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention pertains to apparatuses for measuring characteristics of optical radiation. The operation of certain embodiments of the present invention will be discussed below, primarily in the context of processing semiconductor wafers such as silicon wafers. Embodiments of the present invention and the operation of embodiments of the present invention will be discussed below, primarily in the context of measuring and collecting optical radiation data, specifically spectral emission characteristics for processes that involve optical radiation such as processes used in processing workpieces for fabricating electronic devices. Examples of some of the processes that involve optical radiation for which embodiments of the present invention are suitable are plasma etching, glow discharge sputtering, plasma enhanced chemical vapor deposition, plasma annealing, plasma stripping, photochemical deposition, photochemical etching, optical curing, optical developing, and optical annealing.

A process that involves optical radiation is defined here as meaning a process for which optical radiation is used as part of performing a process or optical radiation is generated by the process. Furthermore, the optical radiation may have an effect on the results of the process or the optical radiation may be an indication of the status or performance of the process. However, it is to be understood that embodiments in accordance with the present invention can be used for substantially any application that involves measuring optical radiation in an environment. In the following description of the figures, identical reference numerals have been used when designating substantially identical elements or steps that are common to the figures.

Figure 1A:
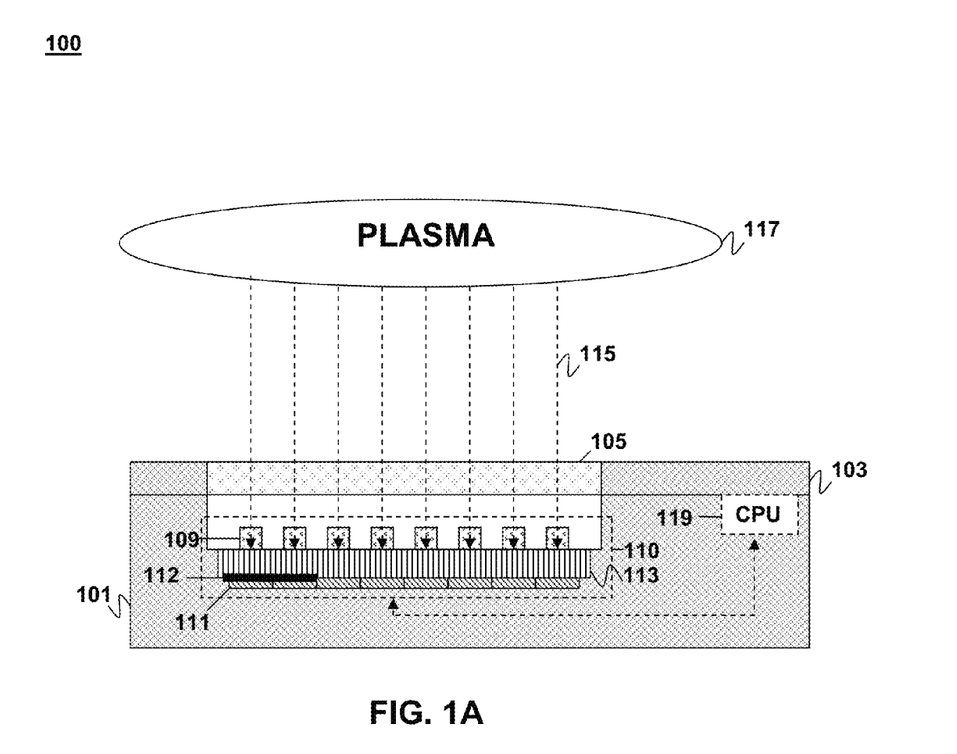
FIG. 1A is a cross-sectional schematic diagram of a sensor apparatus according to an embodiment of the present invention.
Figure 1B:
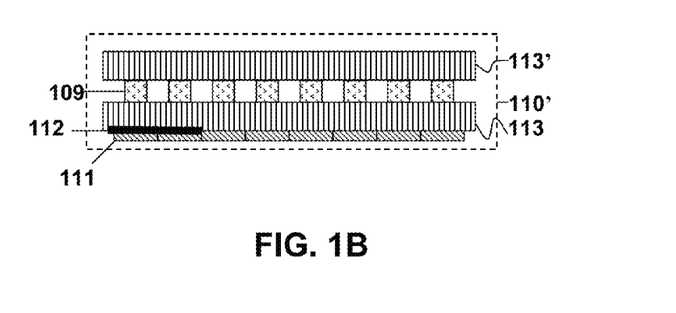
FIG. 1B is a cross-sectional schematic diagram of an alternative low profile wavelength selective detection system that may be used in the sensor apparatus of FIG. 1A.
Figure 1C:
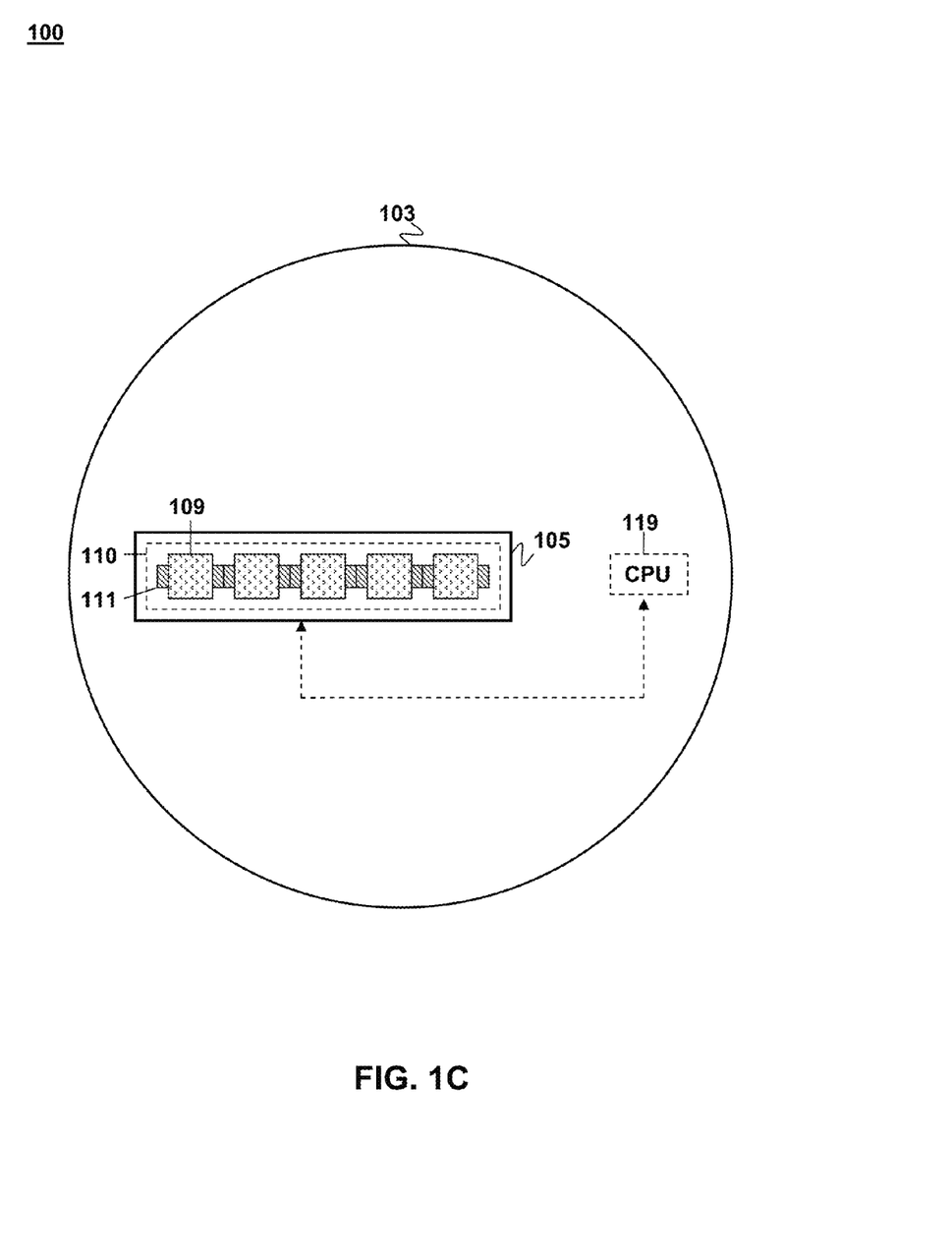
FIG. 1C is a top-view schematic diagram of the sensor apparatus in FIG. 1A.

FIGS. 1A and 1C illustrate a cross-sectional view and a top-view of a sensor apparatus 100 according to an embodiment of the present invention. The sensor apparatus 100 comprises a substrate 101. A cover 103 with an optical element 105 may then be attached to the substrate 101, their combination forming an enclosure. The substrate 101 and cover 103 may be adjoined using any adhesive material suitable for that application. A low profile wavelength selective detection system 110, and (optionally) measurement electronics 119 are positioned within the enclosure formed by the substrate 101 and cover 103. FIG. 1C shows the low profile wavelength selective detection system 110, optical element 105, and measurement electronics 119 using dashed lines to indicate that the low profile wavelength selective detection system 110 and measurement electronics 119 are disposed below the substrate cover 103.

As illustrated here the wavelength selective detection system 110 and measurement electronics 119 are located within the substrate 101. Alternatively the wavelength selective detection system 110 and measurement electronics 119 may be located within the cover 103 or within both the cover 103 and substrate 101. The wavelength selective detection system 110 and measurement electronics 119 are shielded from exposure to the processing conditions of a workpiece processing tool by the cover 103. It should be noted that if the processing conditions of the workpiece would not substantially interfere with the functioning of the wavelength selective detection system 110 and the measurement electronics 119, then the cover 103 may be omitted.

The sensor apparatus 100 is configured to measure spectral emission characteristics experienced by a workpiece during a process that involves optical radiation. By way of example, and not by way of limitation, the operation of the sensor apparatus 100 will be discussed in the context of a plasma process. However, it is important to note that the sensor apparatus 100 may be used in any conditions that involve optical radiation. The sensor apparatus 100 is exposed to plasma 117 within a workpiece processing tool (not shown). Optical radiation 115 emanating from the plasma 117 is directed at the sensor apparatus 100.

The optical element 105 may be configured to selectively concentrate the gathering of optical radiation 115 near the optical element 105 at the top surface of the cover 103. In other words, the optical element 105 may be configured to capture optical radiation 115 located near the cover 103 surface. This allows the spectral emission characteristics of optical radiation 115 determined by the sensor apparatus 100 to be targeted to particular area (e.g., the cover surface) that is most relevant to monitoring and optimizing workpiece processing tool conditions.

By way of example and not by way of limitation, the optical element 105 may be a window composed of sapphire or quartz or any other material that is substantially transparent to optical radiation in the desired range. For preferred embodiments of the present invention, the optical element 105 may be transparent to optical radiation with wavelengths ranging from 100 nm to 2 μm (i.e., deep UV to near IR) and all wavelengths and wavelength ranges subsumed therein. The optical element 105 may also include one or more optical elements such as lenses configured to selectively concentrate the gathering of optical radiation 115 originating at the top surface of the substrate cover 103. In addition, the optical element 105 may include a reflective beam-steering element or window.

While the sensor apparatus 100 illustrated in FIG. 1A shows only a single optical element 105 formed within the substrate cover 103, multiple optical elements may be formed at various locations within the substrate cover 103 in order to facilitate spatial monitoring of optical radiation spectral emission characteristics at a plurality of different locations.

The optical radiation 115 captured by the optical element 105 may be transmitted directly to the low profile wavelength selective detection system 110. The low profile wavelength selective detection system 110 may be configured to determine spectral emission characteristics of the optical radiation 115. Specifically, the low profile wavelength selective detection system 110 can be configured to discriminate one or more emission bands corresponding to one or more chemical species of interest within the captured optical radiation 115. As used herein, the term low profile wavelength selective detection system refers to a device capable of measuring various properties (e.g., spectral emission characteristics) of optical radiation over a specified portion of the electromagnetic spectrum, while meeting the size constraints inherent to implementing such a device within a wafer-like substrate. The wavelength selective detection system 110 is located within the enclosure formed by the cover 103 and the substrate 101. The wavelength selective detection system 110 is shielded from any electromagnetic (EM) noise that may contaminate the determination of spectral emission characteristics of the captured optical radiation 115 by the substrate cover 103. The wavelength selective detection system 110 is also shielded from any RF noise that can interfere with the measurement electronics by the cover 103. It should be noted that if EM and RF noise would not substantially interfere with the functioning of the wavelength selective detection system 110, then the cover may be omitted.

By way of example, and not by way of limitation, the low profile wavelength selective detection system 110 may generally include one or more optical wavelength selectors 109 (e.g., optical bandpass filters) that are optically coupled to a corresponding detector array 111 (e.g., a photodiode array) through an aperture-limiting device 113. The wavelength selectors 109 transmit only the part of the optical radiation 115 of interest to the detector array 111 and by using multiple different wavelength selectors, a set of characteristics of the optical radiation 115 may be surmised. In some implementations opaque material may be placed between adjacent wavelength selectors 109 to avoid undesired coupling of unfiltered radiation to corresponding elements of the detector array 111. The aperture-limiting device 113 may serve to maintain the optical performance of wavelength selectors 109.

The function of the aperture-limiting device 113 depends partly on its location relative to the wavelength selectors 109 and the detector array 111. For example, the aperture-limiting device may 113 be placed underneath the wavelength selectors 109 such that the aperture limiting device is located between the wavelength selectors 109 and the detector array 111, as shown in FIG. 1A. In this configuration, the aperture-limiting device 113 may serve to prevent wide-angle radiation leaving the wavelength selectors 109 from reaching the detector array 111, if, e.g., the wavelength selectors 109 are implemented with photonic crystals. Alternatively, the aperture-limiting device 113 may be located on top of the wavelength selectors 109 such that the wavelength selectors 109 are between the aperture-limiting device and the photodetector array 111. This may be a useful configuration for maintaining the optical performance of the wavelength selectors 109 if they are in the form of an array of bandpass filters. This configuration may also serve to define a collection cone for the radiation 115, if, e.g., the wavelength selectors 109 are implemented with photonic crystals.

By way of example, and not by way of limitation, a thin layer of black glass with holes may be used as the aperture-limiting optical device 113. By way of example, the aspect ratio of the diameter of the holes with respect to their depth may be approximately 1:10 (e.g., a 200 micron thick layer of glass with 20 micron diameter holes that extend through the glass layer). In order for the detector array 111 to adequately detect the optical radiation 115, the area of holes on the surface of the aperture-limiting device 113 may be approximately 50% or more of the overall area. The aperture-limiting device 113 may optionally be fabricated as an integral part of the detector array 111 or as an integral part of the wavelength selectors 109. The aperture-limiting device 113 may also be placed above the wavelength selectors 109, such that the optical radiation 115 passes through the aperture-limiting device 113 before reaching the wavelength selector 109. Additionally, in an alternative low profile wavelength selective detection system 110' as shown in FIG. 1B, an additional aperture-limiting device 113' may be placed above the wavelength selector 109, such that the optical radiation 115 passes through the additional aperture-limiting device 113' before reaching the wavelength selector 109 and then passes through a second aperture-limiting device 113 after exiting the wavelength selector 109. In some implementations, the optical element 105 may be patterned (e.g., with holes of suitable diameter, density, and aspect ratio) to act as the additional aperture-limiting device 113'.

For shorter wavelengths an optical conversion material 112 may be interposed between the detector array 111 and the aperture-limiting device 113 to assist in higher conversion efficiencies. By way of example, and not by way of limitation, the material may be a phosphor, fluorescent material, or a luminescent material, its purpose is to aid in converting all, or in part, a portion of the available short wavelength energy into longer wavelengths that is detectable by the detector array 111.

The measurement electronics 119 may be connected to the low profile wavelength selective detection system 110 so as to allow for analysis (e.g., conversion of intensity map into emission spectrum) of electrical signals produced by the wavelength selective detection system 110. Those skilled in the art are aware that there are numerous commercially available controllers that are suitable for use with the sensor apparatus 100. By way of example, and not by way of limitation, the measurement electronics 119 may include electronic devices such as microprocessors for analyzing the electrical signals generated by the wavelength selective detection system 110. Furthermore, the measurement electronics 119 may include computer readable memory for storing data and instructions. Still further, the measurement electronics 119 may be configured for transmitting data and instructions to a second location using methods such as wireless communication.

Figure 2A:
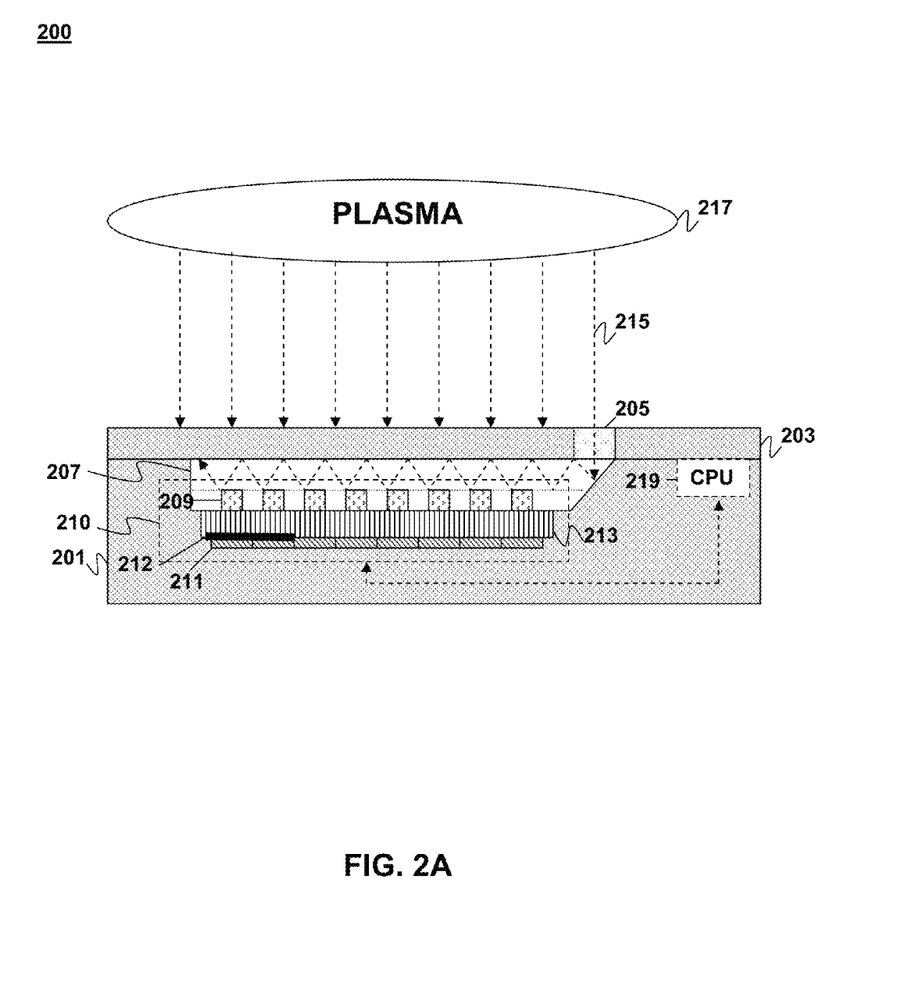
FIG. 2A is a cross-sectional schematic diagram of a sensor apparatus according to an alternative embodiment of the present invention.
Figure 2B:
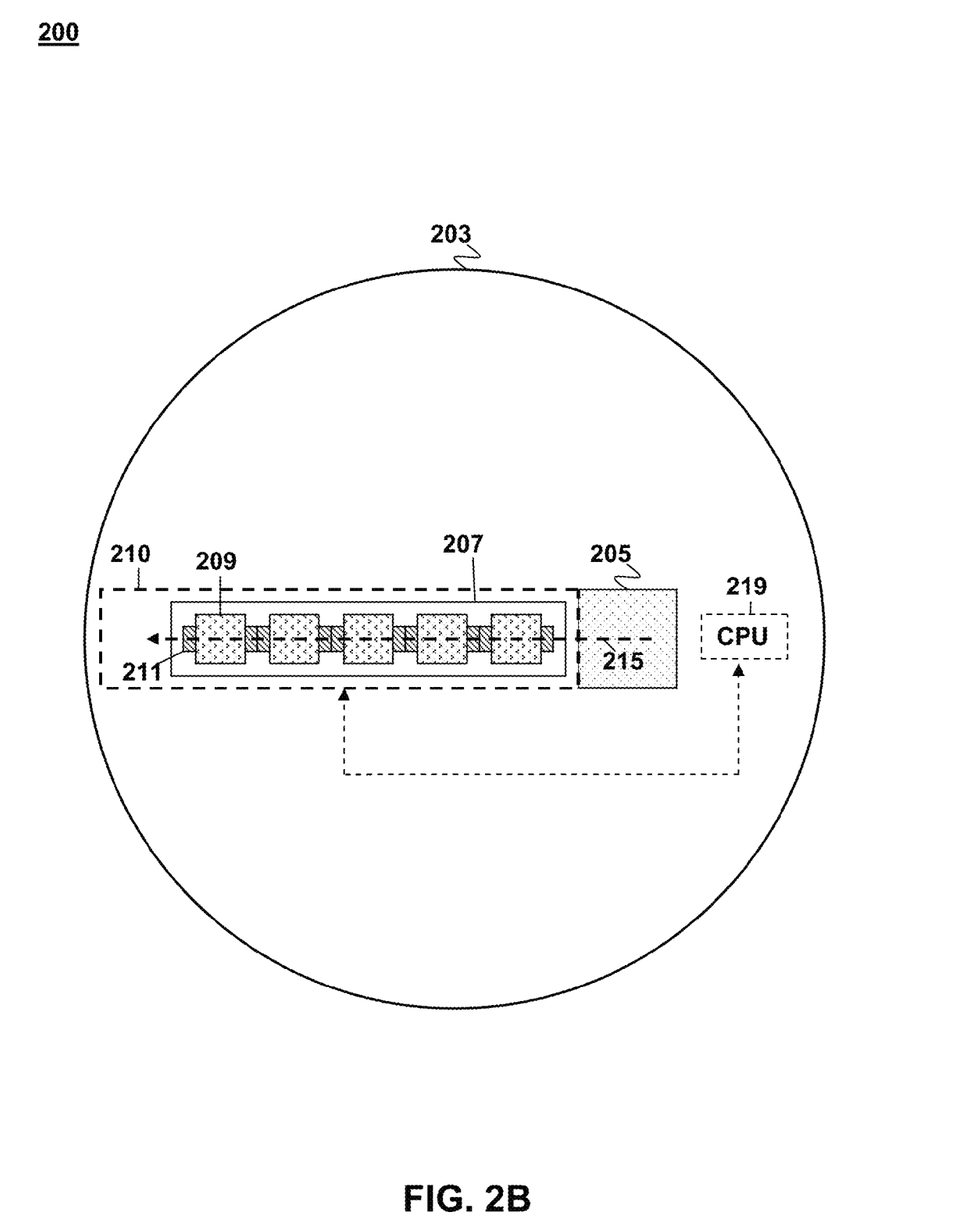
FIG. 2B is a top-view schematic diagram of the sensor apparatus in FIG. 2A.

FIGS. 2A and 2B illustrate a cross-sectional view and a top-view of a sensor apparatus 200 according to an alternative embodiment of the present invention. The sensor apparatus 200 comprises a substrate 201. A cover 203 with an optical element 205 may then be attached to the substrate 201, their combination forming an enclosure. The substrate 201 and cover 203 may be adjoined using any adhesive material suitable for that application. A low profile wavelength selective detection system 210, and (optionally) measurement electronics 219 are positioned within the enclosure formed by the substrate 201 and cover 203. The sensor apparatus 200 also includes an optical waveguide 207 located within the enclosure formed by the substrate 201 and cover 203. FIG. 2B shows the waveguide 207, low profile wavelength selective detection system 210, optical element 205, and measurement electronics 219 using dashed lines to indicate that they are disposed below the substrate cover 203. It is noted that although the optical element 205 and waveguide 207 are shown as separate elements, those skilled in the art will recognize that they may be the same element or integrated into a common structure.

As illustrated here, the waveguide 207, wavelength selective detection system 210, and measurement electronics 219 are located within the substrate 201. Alternatively, the waveguide 207, wavelength selective detection system 210, and measurement electronics 219 may be located within the cover 203 or within both the cover 203 and substrate 201. The waveguide 207, wavelength selective detection system 210, and measurement electronics 219 are shielded from exposure to the processing conditions of a workpiece processing tool by the cover 203. It should be noted that if the processing conditions of the workpiece would not substantially interfere with the functioning of the wavelength selective detection system 210 and the measurement electronics 219, then the cover may be omitted.

The sensor apparatus 200 may be configured to measure spectral emission characteristics experienced by a workpiece during a process that involves optical radiation. For example, the sensor apparatus 201 may be exposed to plasma 217 within a workpiece processing tool (not shown). Optical radiation 215 emanating from the plasma 217 may be directed at the sensor apparatus 200.

The optical element 205 may be configured to selectively collect optical radiation 215 within close proximity to the optical element 205 originating at the top surface of the cover 203. In other words, the optical element 205 may be configured to capture optical radiation 215 located near the cover 203. This allows the spectral emission characteristics of optical radiation 215 determined by the sensor apparatus 200 to be targeted to an area (i.e., the cover surface) that is most relevant to monitoring and optimizing workpiece processing tool conditions.

By way of example, and not by way of limitation, the optical element 205 may be a window composed of sapphire or quartz or any other material that is substantially transparent to optical radiation in the desired range. For certain embodiments of the present invention, the window 205 may be transparent to optical radiation with wavelengths ranging from 100 nm to 2 µm (i.e., deep UV to near IR) and all wavelengths subsumed therein. The optical element 205 may also include one or more optical elements such as lenses configured to selectively concentrate the gathering of optical radiation 215 originating at the top surface of the substrate cover 203.

While the sensor apparatus 200 illustrated in FIG. 2A shows only a single optical element 205 formed within the cover 203, multiple optical elements may be formed at various locations within the cover 203 in order to facilitate spatial monitoring of optical radiation spectral emission characteristics at a plurality of different locations.

The optical radiation 215 captured by the optical element 205 may be transmitted through an optical waveguide 207, rather than being directly transmitted to the wavelength selective detection system as described above with respect to FIGS. 1A and 1B. The optical waveguide 207 may be located within the enclosure formed by the cover 203 and the substrate 201. The waveguide 207 may be configured to receive the optical radiation 215 gathered at the optical element 205 and transmit it in a direction parallel to the plane of the cover 203. The optical waveguide 207 may be shielded from the processing environment by the cover 203. Optical radiation 215 being transmitted by the optical waveguide 207 may also be shielded from the optical noise by the cover 203. Thus, the optical radiation 215 being measured by the wavelength selective detection system 210 may be substantially the same as the optical radiation 215 being captured by an optical element 205 in the form of a window.

The optical waveguide 207 may be the transparent substrate of a photonic crystal structure. Alternatively, the optical waveguide 207 may be an optical fiber or fiber bundle. In such an embodiment, the optical element 205 may be attached to the photonic crystal structure or an end of the optical fiber or optical fiber bundle. Alternatively, the optical waveguide 207 may be implemented by a dielectric slab waveguide or any other waveguide suitable for this application. By way of example, and not by way of limitation, the waveguide 207 may be between 1 micron and 500 microns thick.

By way of example, and not by way of limitation, the wavelength selective detection system 210 may be implemented using one or more narrow bandpass filter detection systems. Such a filter-based detection system may comprise a generally laminar array of optical wavelength selectors 209 (e.g., optical bandpass filters) that are optically coupled to a corresponding photodiode array 211 through an optically transmitting aperture-limiting device 213, which may be in the form of a slab. The wavelength selectors 209 transmit only the part of the optical radiation 215 of interest to the detector array 211 and by using multiple different wavelength selectors, a set of characteristics of the light 215 may be surmised. The aperture-limiting device 213 may serve to maintain the optical performance of the wavelength discriminating waveguide resulting from the combination of the waveguide 207 and the wavelength selectors 209.

By way of example, and not by way of limitation, a thin layer of black glass with holes may be used as the aperture-limiting device 213. By way of example, the aspect ratio of the diameter of the holes with respect to their depth may be approximately 1:10 (e.g., a 200 micron thick layer of glass with 20 micron diameter holes that extend through the glass layer). In order for the detector array 211 to adequately detect the optical radiation 215, the area of holes on the surface of the aperture-limiting device may be approximately 50% or more of the overall area. The aperture-limiting device 213 may optionally be fabricated as an integral part of the sensor array 211. The aperture-limiting device 213 may optionally be fabricated as an integral part of the sensor array 211.

For shorter wavelengths an optical conversion material 212 may be interposed between the detector array 211 and the aperture-limiting device 213 to assist in higher conversion efficiencies. By way of example, and not by way of limitation, the material may be a phosphor, photophore or a fluorescent material, its purpose to aid in converting all, or in part, a portion of the available short wavelength energy into longer wavelengths that is detectable by the detector array 211.

The low profile wavelength selective detection system 210 may be configured to determine spectral emission characteristics of the transmitted optical radiation 215. Specifically, the low profile wavelength selective detection system 210 can be configured to discriminate one or more emission bands corresponding to one or more chemical species of interest within the captured optical radiation 215. The wavelength selective detection system 210 may be located within the enclosure formed by the cover 203 and the substrate 201. The wavelength selective detection system 210 is shielded from any electromagnetic (EM) noise that may contaminate the determination of spectral emission characteristics of the captured optical radiation 215 by the cover 203. The wavelength selective detection system 210 is also shielded from any RF noise that can interfere with the measurement electronics. It should be noted that if EM and RF noise would not substantially interfere with the functioning of the wavelength selective detection system 210, then the cover may be omitted.

By way of example, and not by way of limitation, the wavelength selectors 209 in the low profile wavelength selective detection system 210 may be implemented as an array of photonic crystal patterns (e.g., a pattern of regularly arrayed holes or voids) nanofabricated in a polymer film, semiconductor material, or glass slab, that are configured to selectively couple light of given narrow wavelength ranges to a corresponding detector array 211 and behave as described above with respect to FIGS. 1A and 1B. Alternatively, the wavelength selectors 209 may be implemented as thin film interference filters, colored glass filters, or micro resonators. The wavelength selectors (e.g., thin film interference filters or micro resonators, etc.) may be formed integral to the detector array 211. By way of example, and not by way of limitation, in the case of micro resonators, the detector array 211 may be formed integral to the micro resonators in a common structure.

As illustrated, the wavelength selective detection system 210 may be located below the optical waveguide 207. However, the wavelength selective detection system 210 may alternatively be located in any location within the enclosure formed by the cover 203 and the substrate 201 so long as it is configured to discriminate one or more emission bands corresponding to one or more chemical species of interest within the captured optical radiation. The measurement electronics 219 are connected to the low profile wavelength selective detection system 210 so as to allow for analysis (e.g., conversion of intensity map into emission spectrum) of electrical signals produced by the wavelength selective detection system 210. Those skilled in the art are aware that there are numerous commercially available controllers that are suitable for use with the sensor apparatus 200. By way of example, and not by way of limitation, the measurement electronics 119 may include electronic devices such as microprocessors for analyzing the electrical signals generated by the wavelength selective detection system 210. Furthermore, the measurement electronics 219 may include computer readable memory for storing data and instructions. Still further, the measurement electronics 219 may be configured for transmitting data and instructions to a second location using methods such as wireless communication.

Certain embodiments of the present invention are suitable for obtaining useful information when the sensor apparatus is configured to have properties similar to those of the workpiece. For the application of semiconductor wafer processing, this means that the sensor apparatus 100, 200 may have some of the properties of the semiconductor wafers for which the process is used. Specifically, for the most preferred embodiments of the present invention, the sensor apparatus may mimic the electrical, mechanical, thermal, and chemical properties of the workpiece for which the process is used.

By way of example and not by way of limitation, the sensor apparatus 100, 200 may be configured so that the dimensions and shape of the sensor apparatus 100, 200 approximate the dimensions of the workpiece used in the process. For applications of semiconductor wafer processing, this means that the sensor apparatus 100, 200 may have the shape and approximate dimensions of a semiconductor wafer. For example, the sensor apparatus 100, 200 may be substantially circular and have a diameter approximately equal to that of the semiconductor wafer when the sensor apparatus is used for semiconductor wafer processes. Standard semiconductor wafer diameters include, but are not limited to, e.g., 150 mm, 200 mm, 300 mm, and 450 mm. Furthermore, the material of the sensor apparatus, e.g., the substrate 101, 201 and/or cover 103, 203 may be the same material as is used for standard semiconductor wafers. For example, the substrate and cover may be made of silicon if standard wafers are also made of silicon.

For applications involving the processing of flat panel displays, the sensor apparatus 100, 200 may have about the same dimensions and be made of the same material as a flat panel display substrate with the exception of a possible difference in the thickness of the sensor apparatus and the thickness of the flat panel display substrate. Similarly, for applications involving the processing of photolithography masks, the sensor apparatus 100, 200 may have about the same dimensions and be made from the same material as a photolithography mask substrate with the possible exception that the thickness of the sensor apparatus 100, 200 may differ from that of the photolithography mask substrate.

In preferred embodiments of the present invention for semiconductor wafer processes, the sensor apparatus 100, 200 has dimensions such that the sensor apparatus 100, 200 can be loaded and unloaded to and from the process tool in substantially the same way that the semiconductor wafer or other workpiece is loaded and unloaded. Since most modern semiconductor processing facilities and equipment use robotic systems for loading and unloading wafers, this means that the sensor apparatus 100, 200 is preferably configured so that it can be accommodated by the robotic systems used for loading and unloading semiconductor wafers for processing. In other words, preferred embodiments of the sensor apparatus 100, 200 are configured so as to determine spectral emission characteristics under actual processing conditions and substantially without modifications to or perturbations of the processing equipment.

Applications that involve relatively small substrates such as, for example, substrates about the size of semiconductor wafers, flat panel display substrates, and photolithography masks, the embodiment described above preferably uses measurement electronics 119, 219 having a suitably small size. For such applications, the measurement electronics 119, 219 may include a microprocessor and sufficient accessory components for supporting the microprocessor operation for tasks such as applying electrical signals, measuring electrical signals, processing data, storing data, and transmitting information.

Figure 3:
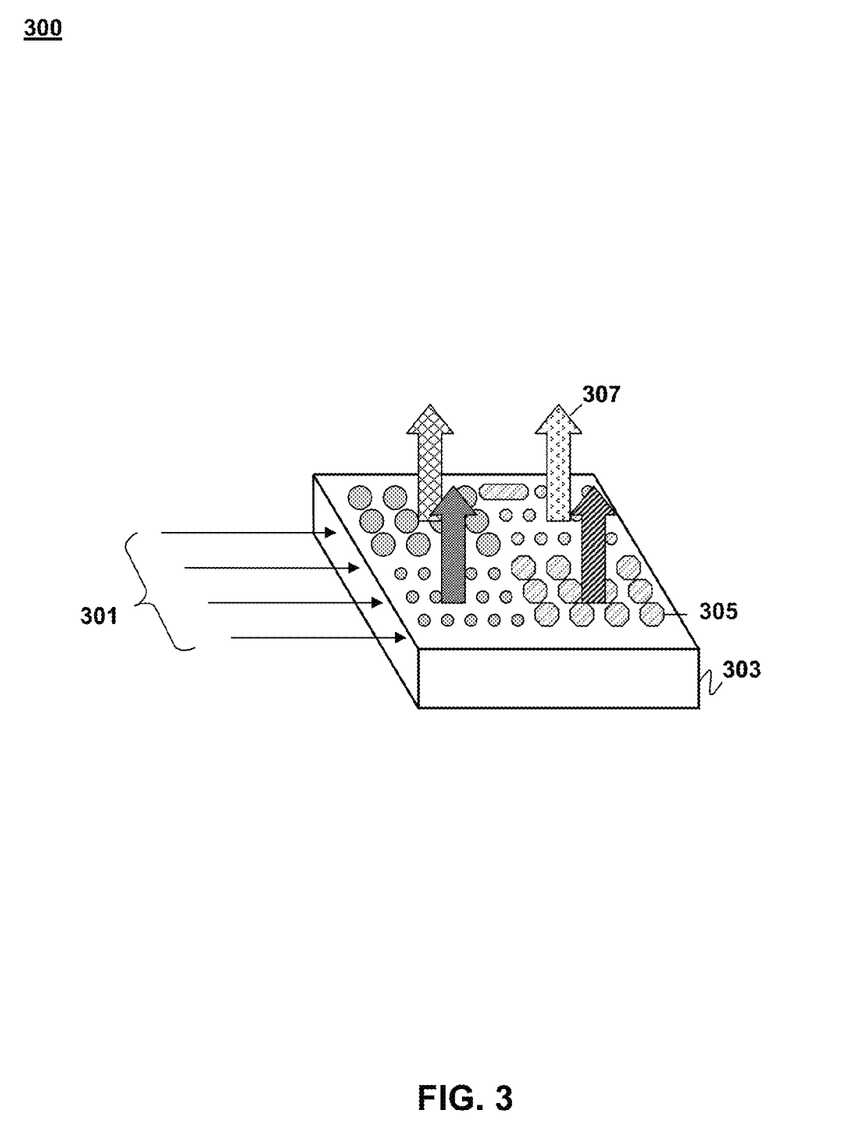
FIG. 3 is a three-dimensional schematic diagram illustrating a low profile photonic crystal spectrometer according to an embodiment of the present invention.

FIG. 3 provides a three-dimensional schematic diagram illustrating the operation of a low profile photonic crystal wavelength selective detection system 300. The photonic crystal wavelength selective detection system 300 can be implemented as an array of photonic crystal patterns 305 (e.g., voids, holes or inclusions of different refractive index materials) nanofabricated in a waveguide base material 303, e.g., a polymer film or a film of different refractive index on a glass substrate to form a photonic crystal structure. In the illustration, optical radiation 301 is introduced into the edge of the transparent base material 303. Photonic crystals 305 with four different lattice constants are patterned in the layer above the base material 303. Each of these patterns outcouples a different band of wavelengths, illustrated by the arrows 307. While the example illustrated in FIG. 3 only provides for four different crystal patterns, it is important to note that any number of different photonic crystal patterns may be used to help determine spectral emission characteristics of incoming optical radiation. The accuracy of the recovered emission spectrum can be improved with the use of more photonic crystal patterns.

Figure 4:
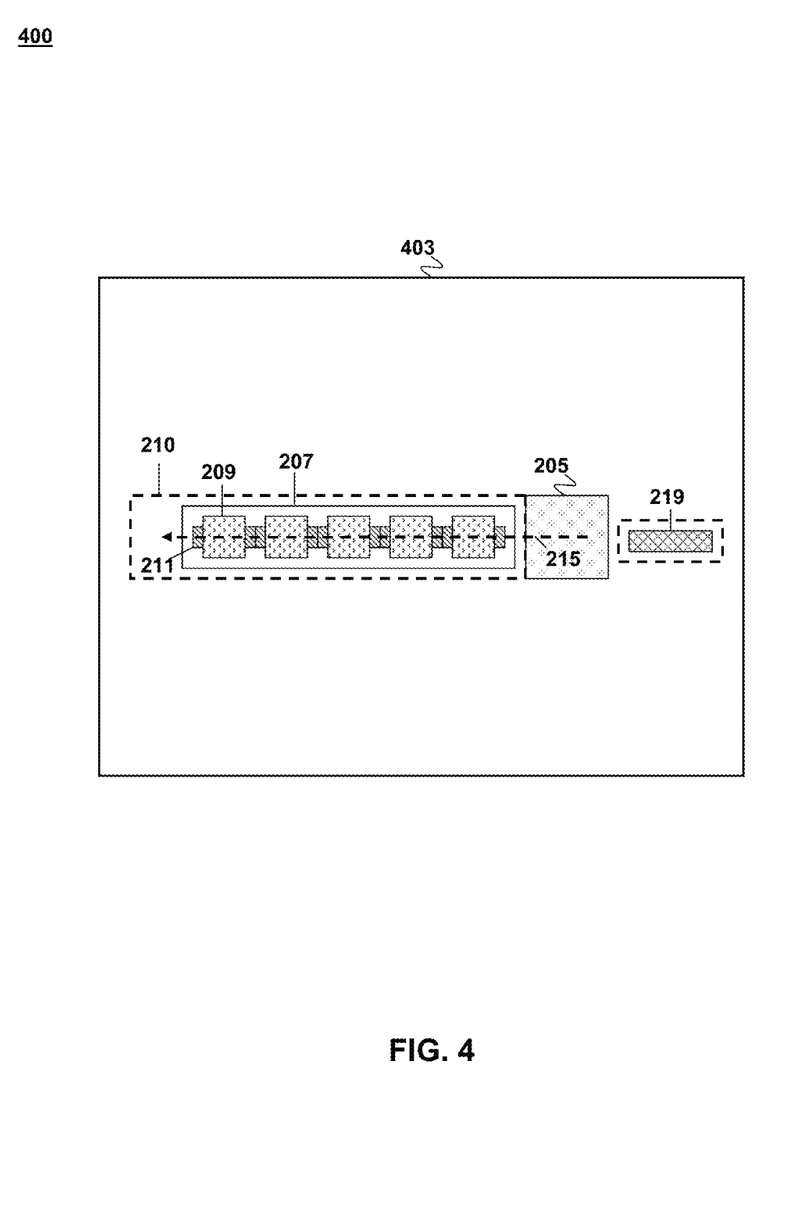
FIG. 4 is a top-view schematic diagram of a sensor apparatus according to an alternative embodiment of the present invention.

FIG. 4 is a top view schematic diagram illustrating a sensor apparatus 400 according to an alternative embodiment of the present invention. The sensor apparatus 400 shown in FIG. 4 may be substantially the same as the sensor apparatus 200 shown in FIGS. 2A and 2B with the exception that the cover 403 and substrate (not shown) are configured in a rectangular form rather than the circular form shown in FIGS. 1C and 2B. A rectangular or a square form for the sensor apparatus 400 would be useful for applications such as those for processing rectangular or square substrates such as substrates used for fabricating flat panel displays and substrates used for fabricating lithography masks.

Figure 5A:
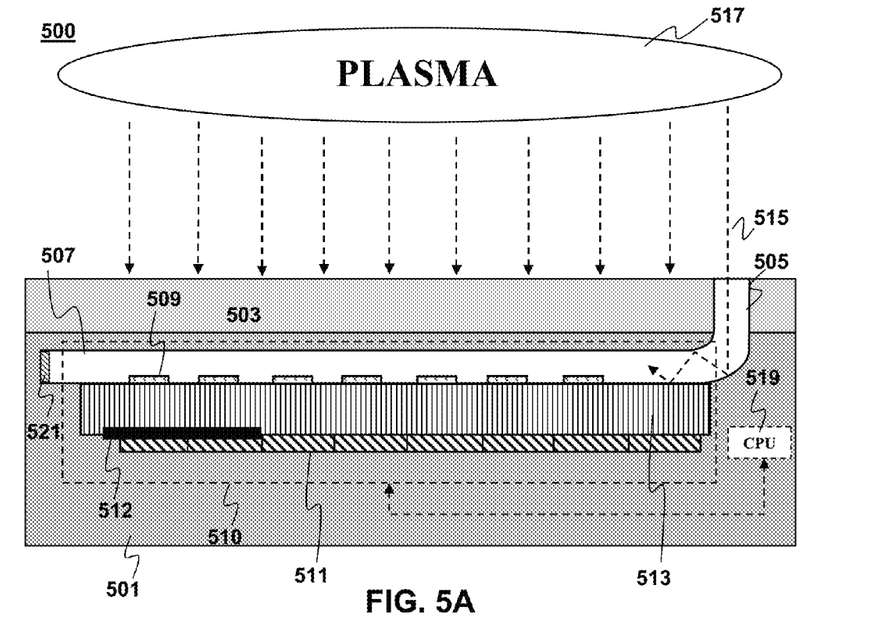
FIG. 5A is a cross-sectional schematic diagram of a sensor apparatus according to an alternative embodiment of the present invention.

FIG. 5A is a cross-sectional view of a sensor apparatus 500 according to an alternative embodiment of the present invention. The sensor apparatus 500 comprises a substrate 501. A cover 503 with an optical element 505 may then be attached to the substrate 501, there combination forming an enclosure. The substrate 501 and cover 503 may be adjoined using any adhesive material suitable for that application. A low profile wavelength selective detection system 510, and (optionally) measurement electronics 519 are positioned within the enclosure formed by the substrate 501 and cover 503. The sensor apparatus 500 also includes an additional optical waveguide 507 located within the enclosure formed by the substrate 501 and cover 503.

As illustrated here, the waveguide 507, wavelength selective detection system 510, and measurement electronics 519 are located within the substrate 501. Alternatively, the waveguide 507, wavelength selective detection system 510, and measurement electronics 519 may be located within the cover 503 or within both the cover 503 and substrate 501. The waveguide 507, wavelength selective detection system 510, and measurement electronics 519 are shielded from exposure to the processing conditions of a workpiece processing tool by the cover 503. It should be noted that if the processing conditions of the workpiece would not substantially interfere with the functioning of the wavelength selective detection system 510 and the measurement electronics 519, then the cover may be omitted.

The sensor apparatus 500 is configured to measure spectral emission characteristics experienced by a workpiece during a process that involves optical radiation. The sensor apparatus 500 is exposed to plasma 517 within a workpiece processing tool (not shown). Optical radiation 515 emanating from the plasma 517 is directed at the sensor apparatus 500.

The optical element 505 may be configured to selectively collect the gathering of optical radiation 515 within close proximity to the optical element 505 originating at the top surface of the cover 503. In other words, the optical element 505 may be configured to capture optical radiation 515 located near the cover 503. This allows the spectral emission characteristics of optical radiation 515 determined by the sensor apparatus 500 to be targeted to an area (i.e., the cover surface) that is most relevant to monitoring and optimizing workpiece processing tool conditions.

The optical element 505 may be composed of sapphire or quartz or any other material that is substantially transparent to optical radiation in the desired range. For preferred embodiments of the present invention, the optical element 505 may be a window that is is transparent to optical radiation with wavelengths ranging from 100 nm to 2 μm (i.e., deep UV to near IR) and all wavelengths subsumed therein. The optical element 505 may also include one or more focusing devices such as lenses configured to selectively concentrate the gathering of optical radiation 515 originating at the top surface of the substrate cover 503.

While the sensor apparatus 500 illustrated in FIG. 5A shows only a single optical element 505 formed within the cover 503, multiple optical elements may be formed at various locations within the cover 503 in order to facilitate spatial monitoring of optical radiation spectral emission characteristics at a plurality of different locations.

The optical radiation 515 captured by the optical element 505 is then transmitted through an optical waveguide 507, rather than being directly transmitted to the wavelength selective detection system as described above with respect to FIGS. 1A and 1B. The optical waveguide 507 is located within the enclosure formed by the cover 503 and the substrate 501. The waveguide 507 is configured to receive the optical radiation 515 gathered at the optical element 505 and transmit it in a direction parallel to the plane of the cover 503. The optical waveguide 507 is shielded from the processing environment by the cover 503. Optical radiation 515 being transmitted by the optical waveguide 507 is also shielded from the optical noise by the cover 503. Thus, the optical radiation 515 being measured by the wavelength selective detection system 510 is substantially the same as the optical radiation 515 being captured by the optical element (e.g., window) 505.

The optical waveguide 507 may be the transparent substrate of the photonic crystal structure or an optical fiber or fiber bundle. In that embodiment, the optical element 505 may be attached to the photonic crystal structure or an end of the optical fiber or optical fiber bundle. Alternatively, the optical waveguide 507 may be implemented by a dielectric slab waveguide or any other waveguide suitable for this application. In some embodiments the waveguide 507 may optionally have a reflective coating 521 on one end thereof to reflect back optical radiation 515 that makes its way from the optical element 505 all the way through the waveguide 507 to the end.

It is noted that the optical waveguide 507 shown in FIG. 5A is bent at one end and receives radiation 515 via an optical element 505 proximate the bend end. However, embodiments of the invention are not limited to such a configuration. In an alternative example shown in FIG. 5C, the waveguide 507 may be bent at both ends and may receive radiation 515 via optical elements proximate both ends.

By way of example, and not by way of limitation, the wavelength selective detection system 510 may be implemented using one or more optical wavelength selectors (e.g., photonic crystals) 509 and detector. The optical wavelength selectors 509 may be generally implemented as a generally laminar array of wavelength selectors with each wavelength selector 509 in the array being optically coupled to a corresponding optical detector (e.g., photodiode) in a detector array 511 through an aperture-limiting device 513. The wavelength selectors 509 transmit only the part of the optical radiation 515 in interest to the detector array 511 and by using multiple different wavelength selectors, a set of characteristics of the light 515 may be surmised. An aperture-limiting device 513 may serve to maintain the optical performance of the wavelength discriminating waveguide formed by the optical waveguide 507 and wavelength selectors 509. In this configuration, the aperture-limiting device 513 may serve to prevent wide-angle radiation leaving the wavelength selectors 509 from reaching the detector array 511, if, e.g., the wavelength selectors 509 are implemented with photonic crystals.

By way of example, and not by way of limitation, a thin layer of black glass with holes may be used as the aperture-limiting device 513. By way of example, the aspect ratio of the diameter of the holes with respect to their depth may be approximately 1:10 (e.g., a 200 micron thick layer of glass with 20 micron diameter holes that extend through the glass layer). In order for the detector array 511 to adequately detect the optical radiation 515, the area of holes on the surface of the aperture limiting device may be approximately 50% or more of the overall area. The aperture limiting device 513 may optionally be fabricated as an integral part of the sensor array 511. The aperture limiting device 513 may optionally be fabricated as an integral part of the sensor array 511.

For shorter wavelengths an optical conversion material 512 may be interposed between the detector array 511 and the aperture-limiting device 513 to assist in higher conversion efficiencies. By way of example, and not by way of limitation, the material may be a phosphor, photophore or a luminescent material or fluorescent material, its purpose to aid in converting all, or in part, a portion of the available short wavelength energy into longer wavelengths that is detectable by the detector array 511.

The low profile wavelength selective detection system 510 may be configured to determine spectral emission characteristics of the transmitted optical radiation 515. Specifically, the low profile wavelength selective detection system 510 can be configured to discriminate one or more emission bands corresponding to one or more chemical species of interest within the captured optical radiation 515. The wavelength selective detection system 510 is located within the enclosure formed by the cover 503 and the substrate 501. The wavelength selective detection system 510 is shielded from any electromagnetic (EM) noise that may contaminate the determination of spectral emission characteristics of the captured optical radiation 515 by the cover 503. The wavelength selective detection system 510 is also shielded from any RF noise that can interfere with the measurement electronics. It should be noted that if EM and RF noise would not substantially interfere with the functioning of the wavelength selective detection system 510, then the cover may be omitted.

Figure 5B:
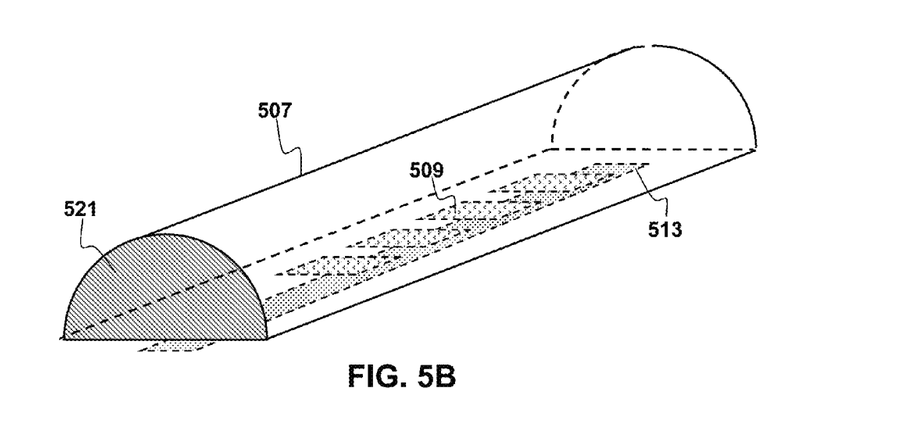
FIG. 5B is a perspective drawing of a portion of a fiber optic cable with the wavelength discriminating element fabricated thereon in accordance with the embodiment depicted in FIG. 5A.
Figure 5C:
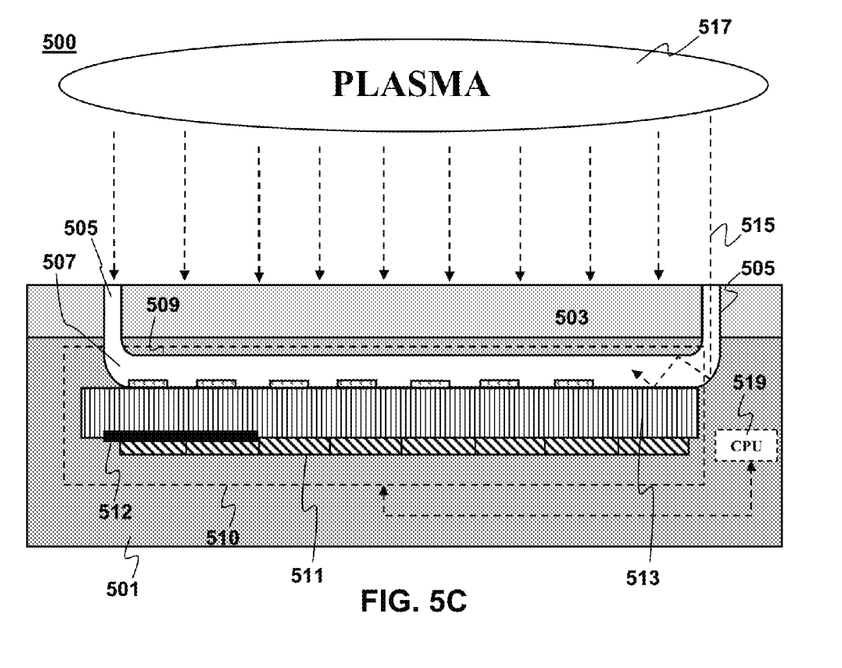
FIG. 5C is a cross-sectional schematic diagram of a sensor apparatus according to an alternative embodiment of the present invention.

According to this embodiment, the low profile wavelength selective detection system 510 may be implemented using a photonic crystal wavelength selector. As illustrated in FIG. 5B, a photonic crystal wavelength selector may comprise an array of photonic crystal patterns 509 (e.g., a pattern of regularly arrayed holes or voids) etched onto a flattened surface of the waveguide's 507 base material and coupled to a corresponding photodiode array 511 and behaves as described above with respect to FIGS. 2A and 2B. FIG. 5B is a perspective view of a portion of a waveguide 507 implemented as a flattened optical fiber with the photonic crystal patterns 509 etched onto the bottom flat surface thereof. The flat bottom surface may be formed, e.g., by polishing a side of an optical fiber. Alternatively, the photonic crystal patterns 509 may be formed by forming a thin layer of PMMA on the bottom surface of the waveguide, and etching the PMMA instead of the waveguide. By way of example and not by way of limitation, the layer of PMMA may be only several microns thick and may be etched with an electron beam.

The measurement electronics 519 may be connected to the low profile wavelength selective detection system 510 so as to allow for analysis (e.g., conversion of intensity map into emission spectrum) of electrical signals produced by the wavelength selective detection system 510. Those skilled in the art are aware that there are numerous commercially available controllers that are suitable for use with the sensor apparatus 500. By way of example, and not by way of limitation, the measurement electronics 519 may include electronic devices such as microprocessors for analyzing the electrical signals generated by the wavelength selective detection system 510. Furthermore, the measurement electronics 519 may include computer readable memory for storing data and instructions. Still further, the measurement electronics 519 may be configured for transmitting data and instructions to a second location using methods such as wireless communication.

Although examples have been described herein in which the sensor apparatus uses a substrate sized and shaped to correspond to a workpiece such as a semiconductor wafer or flat panel substrate embodiments of the present invention are not limited to such implementations. For example, the sensor apparatus may configured to have dimensions substantially equal to those of a lab-on-a-chip so that the apparatus can be implemented in lab-on-a-chip devices, which can be used, e.g., in clinical diagnostic applications. Typical lab-on-a-chip dimensions may include an area up to a few square centimeters and a thickness of up to a few millimeters. A typical range of lateral dimensions (length and width) for a lab-on-a-chip can be from about one centimeter to about 10 centimeters and all ranges subsumed therein. A typical thickness range for a lab-on-a-chip device is from about 0.5 millimeters to about 5 millimeters and all ranges subsumed therein. With the benefit of the teachings presented in the foregoing descriptions and the associated drawings, many modifications and other embodiments of the invention will come to mind to one skilled in the art to which this invention pertains. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While there have been described and illustrated specific embodiments of the invention, it will be clear that variations in the details of the embodiments specifically illustrated and described may be made without departing from the true spirit and scope of the invention as defined in the appended claims and their legal equivalents.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any element in a claim that does not explicitly state "means for" performing a specified function, is not to be interpreted as a "means" or "step" clause as specified in 35 USC § 112, ¶ 6. In particular, the use of "step of" in the claims herein is not intended to invoke the provisions of 35 USC § 112, ¶ 6.

What is claimed is:

1. A sensor apparatus, comprising:
a) a substrate;
b) a spectrally selective detection system that includes a generally laminar array of optical wavelength selectors optically coupled to a corresponding array of optical detectors located within the substrate;
c) a cover, wherein the spectrally sensitive detection system is sandwiched between the substrate and the cover; and
d) an aperture-limiting device, wherein the aperture-limiting device is between the array of optical wavelength selectors and the array of optical detectors, or wherein the array of optical wavelength selectors is between the aperture-limiting device and the array of optical detectors or wherein the array of optical wavelength selectors is between first and second aperture-limiting devices.

2. The sensor apparatus of claim 1 further comprising an optical element formed within the cover, wherein the optical element is optically coupled to the spectrally selective detection system.

3. The sensor apparatus of claim 1 further comprising an optical element formed as part of the cover, wherein the optical element is optically coupled to the spectrally selective detection system.

4. The sensor apparatus of claim 1, wherein the wavelength selective detection system includes a photonic crystal spectrometer comprising an array of photonic crystal patterns nanofabricated and coupled to a corresponding photodiode array.

5. The sensor apparatus of claim 1, wherein the wavelength selective detection system includes one or more thin film interference filters.

6. The sensor apparatus of claim 5, wherein the one or more thin film interference filters is integral to the array of optical detectors.

7. The sensor apparatus of claim 1, wherein the optical wavelength selectors are a series of one or more colored glass filters.

8. The sensor apparatus of claim 1, wherein the optical wavelength selectors are a series of one or more micro resonators.

9. The sensor apparatus of claim 8, wherein the array of optical detectors is integral to the optical wavelength selectors.

10. The sensor apparatus of claim 1, wherein the aperture-limiting device is between the array of optical wavelength selectors and the array of optical detectors, wherein the aperture-limiting device is a layer of material sandwiched between the array of optical wavelength selectors and the array of optical detectors.

11. The sensor apparatus of claim 10, wherein the layer of material has an array of holes configured to limit an aperture of light transmitted from the wavelength selectors to the array of optical detectors.

12. The sensor apparatus of claim 1, wherein the aperture-limiting device is between the array of optical wavelength selectors and the array of optical detectors, wherein the aperture-limiting device is formed integrally with the array of optical detectors.

13. The sensor apparatus of claim 1, wherein the aperture-limiting device is between the array of optical wavelength selectors and the array of optical detectors, the sensor apparatus further comprising an additional aperture-limiting device, wherein the array of wavelength selectors is sandwiched between the aperture-limiting device and the additional the aperture-limiting device.

14. The sensor apparatus of claim 1, further comprising an optical element that is optically coupled to the spectrally selective detection system.

15. The sensor apparatus of claim 14, wherein the optical element is composed of quartz.

16. The sensor apparatus of claim 14, wherein the optical element is composed of sapphire.

17. The sensor apparatus of claim 14, wherein the optical element is a window.

18. The sensor apparatus of claim 14, wherein the optical element is a reflective beam-steering element.

19. The sensor apparatus of claim 14, wherein the optical element is an optical wave guide.

20. The sensor apparatus of claim 14, wherein the optical element is patterned to provide an aperture-limiting device.

21. The sensor apparatus of claim 14, wherein the optical element is an optical lens.

22. The sensor apparatus of claim 14, wherein the optical element is substantially transparent to optical radiation with wavelengths ranging from about 100 nm to about 2 micron.

23. The sensor apparatus of claim 1, wherein the sensor apparatus is substantially circular and the sensor apparatus has a characteristic diameter substantially equal to the characteristic diameter of a semiconductor wafer.

24. The sensor apparatus of claim 1, wherein the sensor apparatus has characteristic length and width dimensions substantially equal to characteristic length and width dimensions of a flat panel display substrate.

25. The sensor apparatus of claim 1, wherein the sensor apparatus has length and width dimensions substantially equal to the length and width dimensions of a lithography substrate for manufacture of a lithography mask.

26. The sensor apparatus of claim 1, wherein the sensor apparatus has dimensions substantially equal to those of a lab-on-chip.

27. A sensor apparatus, comprising:
   a) a substrate;
   b) a spectrally selective detection system that includes a generally laminar array of optical wavelength selectors optically coupled to a corresponding array of optical detectors located within the substrate;
   c) a cover, wherein the spectrally sensitive detection system is sandwiched between the substrate and the cover; and
   d) an optical waveguide positioned between the substrate and the cover, wherein the optical waveguide is configured to transmit optical radiation to the detector in a spectrally selective fashion, wherein the optical waveguide is an optical fiber or optical fiber bundle or a transparent substrate with a photonic crystal structure formed thereon providing the generally laminar array of optical wavelength selectors.

28. The sensor apparatus of claim 27, wherein the optical waveguide is an optical fiber, further comprising an optical element attached to an end of the optical fiber.

29. The sensor apparatus of claim 27, wherein the optical waveguide is composed of quartz.

30. The sensor apparatus of claim 27, wherein the optical waveguide is composed of sapphire.

31. The sensor apparatus of claim 27, wherein the optical waveguide is between 1 micron and 500 microns thick.

32. A sensor apparatus, comprising:
   a) substrate;
   b) a spectrally selective detection system that includes a generally laminar array of optical wavelength selectors optically coupled to a corresponding array of optical detectors located within the substrate;
   c) a cover, wherein the spectrally sensitive detection system is sandwiched between the substrate and the cover; and
   d) an optical waveguide positioned between the substrate and the cover, wherein the optical waveguide is configured to transmit optical radiation to the detector in a spectrally selective fashion, wherein the optical waveguide is an optical fiber having a flattened side, wherein the generally laminar array of optical wavelength selectors is formed on the flattened side.

* * * * *